(12) United States Patent
Komatsu et al.

(10) Patent No.: US 11,274,200 B2
(45) Date of Patent: Mar. 15, 2022

(54) INTERLAYER FOR LAMINATED GLASS, AND LAMINATED GLASS

(71) Applicant: SEKISUI CHEMICAL CO., LTD., Osaka (JP)

(72) Inventors: Ryousuke Komatsu, Kouka (JP); Jun Sasaki, Kouka (JP); Tatsuya Iwamoto, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 115 days.

(21) Appl. No.: 15/930,220

(22) Filed: May 12, 2020

(65) Prior Publication Data

US 2020/0269550 A1 Aug. 27, 2020

Related U.S. Application Data

(62) Division of application No. 15/115,679, filed as application No. PCT/JP2015/054840 on Feb. 20, 2015, now abandoned.

(30) Foreign Application Priority Data

Feb. 20, 2014 (JP) .................................. 2014-030890

(51) Int. Cl.
  *B32B 37/00* (2006.01)
  *C08L 29/14* (2006.01)
  (Continued)

(52) U.S. Cl.
  CPC .............. *C08L 29/14* (2013.01); *B29C 48/14* (2019.02); *B32B 17/10036* (2013.01);
  (Continued)

(58) Field of Classification Search
  CPC ...................... B29C 48/14; B32B 17/10036
  See application file for complete search history.

(56) References Cited

U.S. PATENT DOCUMENTS

| 5,190,826 A | 3/1993 | Asahina et al. |
| 2009/0226728 A1 | 9/2009 | Onoe et al. |

(Continued)

FOREIGN PATENT DOCUMENTS

| CN | 101910084 A | 12/2010 |
| EP | 2 223 965 A1 | 9/2010 |

(Continued)

OTHER PUBLICATIONS

International Search Report for the Application No. PCT/JP2015/054840 dated May 26, 2015.

(Continued)

*Primary Examiner* — Zachary M Davis
(74) *Attorney, Agent, or Firm* — Cheng Law Group, PLLC

(57) ABSTRACT

There is provided an interlayer film for laminated glass with which the transparency can be enhanced. The interlayer film for laminated glass according to the present invention is in a sea-island state having a sea-like dark part and a plurality of island-like bright parts to be identified when observed with a transmission electron microscope, a thermoplastic resin is contained in the dark part region and a thermoplastic resin is contained in the bright part region, and the arithmetic average value of major diameters of the bright parts is less than or equal to 400 nm or the median value of major diameters of the bright parts is less than or equal to 400 nm.

8 Claims, 2 Drawing Sheets

(51) Int. Cl.
*C08J 5/18* (2006.01)
*B32B 17/10* (2006.01)
*B29C 48/14* (2019.01)

(52) U.S. Cl.
CPC ........... *B32B 17/10761* (2013.01); *C08J 5/18* (2013.01); *B32B 2250/03* (2013.01); *B32B 2307/412* (2013.01); *C08J 2329/14* (2013.01); *C08J 2429/14* (2013.01); *C08L 2201/08* (2013.01); *C08L 2201/10* (2013.01); *C08L 2203/16* (2013.01); *C08L 2205/025* (2013.01)

(56) References Cited

U.S. PATENT DOCUMENTS

| | | |
|---|---|---|
| 2010/0273012 A1 | 10/2010 | Moriguchi et al. |
| 2010/0279150 A1 | 11/2010 | Hatta et al. |
| 2011/0049434 A1 | 3/2011 | Ootsuki et al. |
| 2011/0186791 A1 | 8/2011 | Furukawa et al. |
| 2011/0192678 A1 | 8/2011 | Matsuda et al. |
| 2011/0229714 A1 | 9/2011 | Morikawa et al. |
| 2012/0003482 A1 | 1/2012 | Toyama et al. |
| 2012/0041123 A1 | 2/2012 | Ootsuki et al. |
| 2013/0273378 A1 | 10/2013 | Iwamoto et al. |
| 2014/0364550 A1 | 12/2014 | Lu |
| 2016/0046783 A1 | 2/2016 | Asanuma |
| 2016/0046784 A1 | 2/2016 | Asanuma et al. |

FOREIGN PATENT DOCUMENTS

| | | |
|---|---|---|
| EP | 2 977 403 A1 | 1/2016 |
| JP | 56-145132 A | 11/1981 |
| JP | 2002-104878 A | 4/2002 |
| JP | 2002-326844 A | 11/2002 |
| JP | 2007-70200 A | 3/2007 |
| JP | 2013-91591 A | 5/2013 |
| JP | 2014-214211 A | 11/2014 |
| JP | 2015-67804 A | 4/2015 |
| WO | WO-2008/143195 A1 | 11/2008 |
| WO | WO-2010/055731 A1 | 5/2010 |
| WO | WO-2012/091116 A1 | 7/2012 |
| WO | WO-2014/147842 A1 | 9/2014 |
| WO | WO-2015/046583 A1 | 4/2015 |

OTHER PUBLICATIONS

Written Opinion of the International Searching Authority (PCT/ISA/237) for Application No. PCT/JP2015/054840 dated May 26, 2015 (English Translation mailed Sep. 1, 2016).
Supplementary European Search Report for the Application No. EP 15 75 1881 dated Aug. 17, 2017.
Database WPI, Week 200258, Thomson Scientific, London, GB; AN 2002-541273 XP002772735 (and JP 2002-104878 A).
The First Office Action for the Application No. 201580001287.2 from The State Intellectual Property Office of the People's Republic of China dated Apr. 23, 2018.
Indian Office Action for the Application No. 201637028170 dated May 9, 2019.

[FIG. 1]
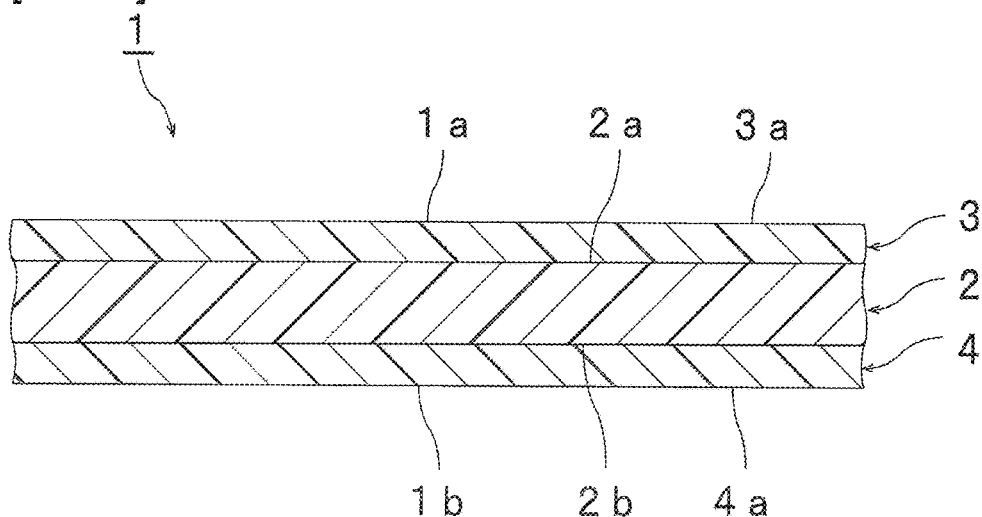
[FIG. 2]
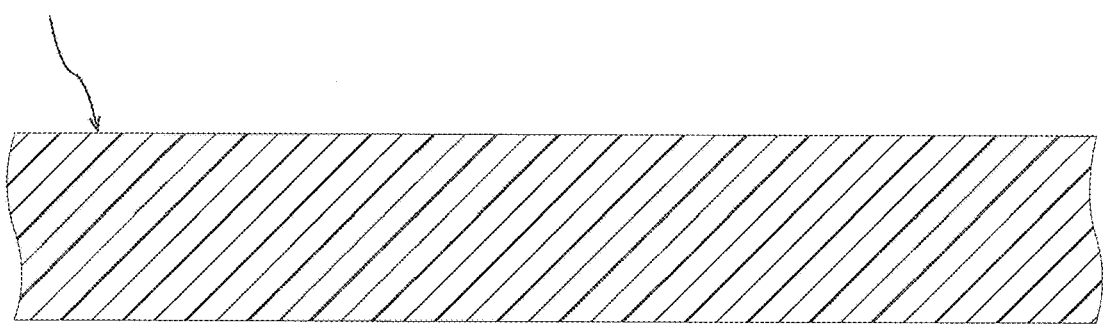
[FIG. 3]
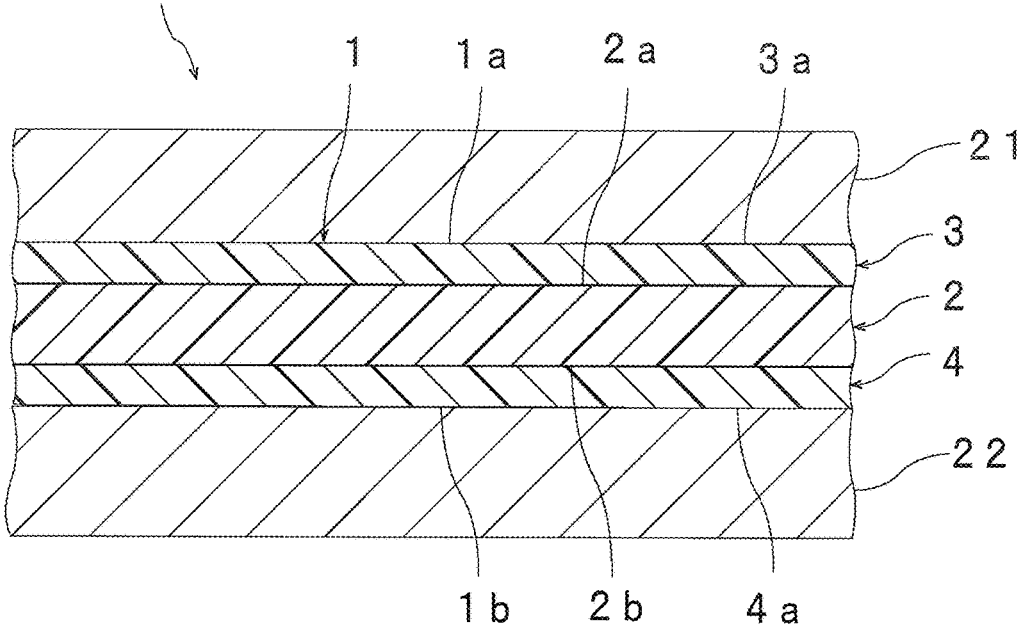

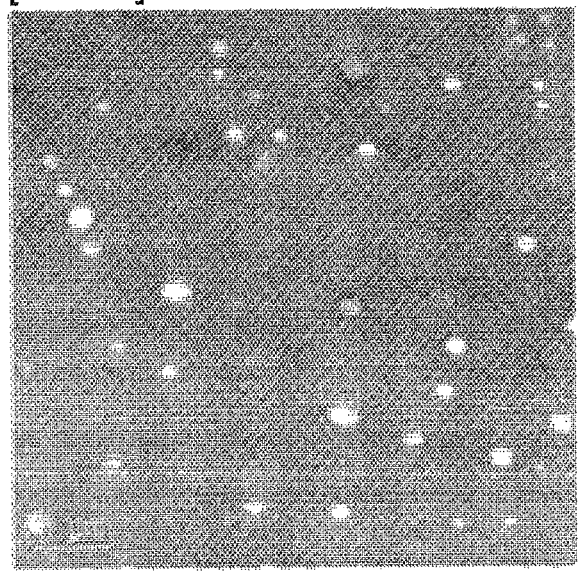
[FIG. 4]

INTERLAYER FOR LAMINATED GLASS, AND LAMINATED GLASS

CROSS-REFERENCE TO RELATED APPLICATIONS

This application is a Divisional Application of patent application Ser. No. 15/115,679, filed on Jul. 31, 2016, which is a 371 application of Application Serial No. PCT/JP2015/054840, filed on Feb. 20, 2015, which is based on Japanese Patent Application No. 2014-030890, filed on Feb. 20, 2014, the entire contents of which are hereby incorporated by reference.

TECHNICAL FIELD

The present invention relates to an interlayer film for laminated glass which is used for laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an intermediate film between a pair of glass plates.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount greater than 30 parts by weight. This sound insulating layer can be used alone as a single-layered interlayer film.

Furthermore, the following Patent Document 1 also describes a multilayer interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount less than or equal to 30 parts by weight.

RELATED ART DOCUMENT

Patent Document

Patent Document 1: JP 2007-070200 A

SUMMARY OF THE INVENTION

Problems to be Solved by the Invention

In recent years, for the purpose of reducing the environmental load, a technique for reusing such an interlayer film for laminated glass described in Patent Document 1 as a part of the raw material of a new interlayer film for laminated glass has been studied. However, when an interlayer film for laminated glass is reused as a part of the raw material of a new interlayer film for laminated glass, there are cases where the transparency of the interlayer film for laminated glass is lowered depending on the existing state of a thermoplastic resin such as a polyvinyl acetal resin.

An object of the present invention is to provide an interlayer film for laminated glass with which the transparency can be enhanced, and further specifically, an object of the present invention is to provide an interlayer film for laminated glass with which the transparency can be enhanced even when different kinds of thermoplastic resins are combinedly used. Moreover, the present invention is also aimed at providing laminated glass prepared with the interlayer film for laminated glass.

Means for Solving the Problems

According to a broad aspect of the present invention, there is provided an interlayer film for laminated glass being in a sea-island state having a sea-like dark part and a plurality of island-like bright parts to be identified when observed with a transmission electron microscope, wherein a thermoplastic resin is contained in the dark part region and a thermoplastic resin is contained in the bright part region, and the arithmetic average value of major diameters of the bright parts is less than or equal to 400 nm or the median value of major diameters of the bright parts is less than or equal to 400 nm.

In a specific aspect of the interlayer film for laminated glass according to the present invention, the arithmetic average value of major diameters of the bright parts is greater than or equal to 50 nm and less than or equal to 400 nm or the median value of major diameters of the bright parts is greater than or equal to 50 nm and less than or equal to 400 nm.

In a specific aspect of the interlayer film for laminated glass according to the present invention, the thermoplastic resin contained in the dark part region and the thermoplastic resin contained in the bright part region are different from each other.

In a specific aspect of the interlayer film for laminated glass according to the present invention, the thermoplastic resin contained in the dark part region is a polyvinyl acetal resin and the thermoplastic resin contained in the bright part region is a polyvinyl acetal resin.

In a specific aspect of the interlayer film for laminated glass according to the present invention, the content ratio of the hydroxyl group of the polyvinyl acetal resin contained in the dark part region is higher than the content ratio of the hydroxyl group of the polyvinyl acetal resin contained in the bright part region.

In a specific aspect of the interlayer film for laminated glass according to the present invention, the content ratio of the hydroxyl group of the polyvinyl acetal resin contained in the dark part region is greater than or equal to 25% by mole.

In a specific aspect of the interlayer film for laminated glass according to the present invention, the content ratio of the hydroxyl group of the polyvinyl acetal resin contained in the bright part region is lower than the content ratio of the hydroxyl group of the polyvinyl acetal resin contained in the dark part region.

In a specific aspect of the interlayer film for laminated glass according to the present invention, the content ratio of the hydroxyl group of the polyvinyl acetal resin contained in the bright part region is less than 25% by mole.

In a specific aspect of the interlayer film for laminated glass according to the present invention, the ratio of the area of the bright part region to the total of the area of the dark part region and the area of the bright part region is less than or equal to 7.8%, and in another specific aspect thereof, the ratio of the area of the bright part region to the total of the area of the dark part region and the area of the bright part region is greater than or equal to 0.5% and less than or equal to 7.8%.

In a specific aspect of the interlayer film for laminated glass according to the present invention, the interlayer film for laminated glass further includes a plasticizer.

It is preferred that the arithmetic average value of major diameters of the bright parts be greater than or equal to 50 nm and less than or equal to 400 nm. It is also preferred that the median value of major diameters of the bright parts be greater than or equal to 50 nm and less than or equal to 400 nm.

According to a broad aspect of the present invention, there is provided laminated glass including a first laminated glass member, a second laminated glass member and the interlayer film for laminated glass described above, wherein the interlayer film is arranged between the first laminated glass member and the second laminated glass member.

Effect of the Invention

Since the interlayer film for laminated glass according to the present invention is in a sea-island state having a sea-like dark part and a plurality of island-like bright parts to be identified when observed with a transmission electron microscope, a thermoplastic resin is contained in the dark part region and a thermoplastic resin is contained in the bright part region, and the arithmetic average value of major diameters of the bright parts is less than or equal to 400 nm or the median value of major diameters of the bright parts is less than or equal to 400 nm, it is possible to enhance the transparency.

BRIEF DESCRIPTION OF DRAWINGS

FIG. 1 is a partially cut-away sectional view schematically showing a multi-layered interlayer film including an interlayer film for laminated glass in accordance with the first embodiment of the present invention.

FIG. 2 is a partially cut-away sectional view schematically showing an interlayer film for laminated glass in accordance with the second embodiment of the present invention.

FIG. 3 is a partially cut-away sectional view schematically showing an example of laminated glass prepared with the multi-layered interlayer film shown in FIG. 1.

FIG. 4 shows an example of an image of an interlayer film, which is included in the interlayer film according to the present invention, photographed by a transmission electron microscope.

MODE(S) FOR CARRYING OUT THE INVENTION

Hereinafter, the details of the present invention will be described.

The interlayer film for laminated glass (hereinafter, sometimes abbreviated as the interlayer film) according to the present invention includes at least one kind of a thermoplastic resin and preferably includes at least two kinds of thermoplastic resins.

The interlayer film according to the present invention is in a sea-island state having a sea-like dark part and a plurality of island-like bright parts to be identified when observed with a transmission electron microscope. A thermoplastic resin is contained in the dark part region. A thermoplastic resin is contained in the bright part region. In the interlayer film according to the present invention, the arithmetic average value of major diameters of the bright parts is less than or equal to 400 nm or the median value of major diameters of the bright parts is less than or equal to 400 nm.

Since the interlayer film according to the present invention is provided with the above-described configuration, particularly the arithmetic average value of major diameters of the bright parts is less than or equal to 400 nm or the median value of major diameters of the bright parts is less than or equal to 400 nm, the transparency can be enhanced in the interlayer film according to the present invention. The island-like bright parts having a specific size greatly contribute to maintaining the transparency high.

For example, the observation with a transmission electron microscope is performed by observing a (square) region of 7.29 μm by 7.29 μm at 3000 magnifications. Using the Photoshop CS4 ver. 11.0 (available from Adobe Systems Incorporated), an image photographed by the transmission electron microscope is subjected to binarization processing with a threshold value of 170. After the binarization processing, the number of picture elements (the number of pixels) in a bright part region is determined. The arithmetic average value of major diameters of the bright parts, the median value of major diameters of the bright parts and the area ratio of the bright part are determined on the basis of the number of pixels. In this connection, it is preferred that the Photoshop be activated and "image", "Adjustment" and "Threshold" be selected in this order at the time of the binarization processing to determine the threshold value.

A measurement sample is obtained in the following manner. An interlayer film is subjected to osmium staining, after which the film is cut in the direction perpendicular to the thickness direction of the interlayer film with a cryo-microtome (available from Leica Microsystems GmbH: UC7) and the center part in the thickness direction of the interlayer film is cut into a section with a thickness of 70 nm to prepare a measurement sample. Specifically, a small piece of an interlayer film subjected to trimming is stained for 12 hours at 60° C. with an aqueous 2% osmic acid solution and then washed. The temperature of the small piece is controlled to −20° C., the small piece is cut in the direction perpendicular to the thickness direction of the interlayer film with a cryo-microtome (available from Leica Microsystems GmbH, Main body: UCT, Cryochamber: EMFCS), the center part in the thickness direction of the interlayer film is cut into a section with a thickness of 70 nm, and the section is placed on a sheet mesh attached with a supporting film to prepare a measurement sample.

From the viewpoint of further improving the transparency, the arithmetic average value of major diameters of the bright parts is preferably greater than or equal to 10 nm, more preferably greater than or equal to 50 nm, further preferably greater than or equal to 80 nm, especially preferably greater than or equal to 100 nm, less than or equal to 400 nm, preferably less than or equal to 300 nm, more preferably less than or equal to 280 nm, further preferably less than or equal to 250 nm, and especially preferably less than or equal to 240 nm.

From the viewpoint of further improving the transparency, the median value of major diameters of the bright parts is preferably greater than or equal to 10 nm, more preferably greater than or equal to 50 nm, further preferably greater than or equal to 80 nm, especially preferably greater than or equal to 100 nm, less than or equal to 400 nm, preferably less than or equal to 300 nm, more preferably less than or equal to 280 nm, further preferably less than or equal to 250 nm, and especially preferably less than or equal to 240 nm.

The ratio of the area of the bright part region (the area ratio of the bright part region) to the total of the area of the dark part region and the area of the bright part region is preferably greater than or equal to 0.1%, more preferably greater than or equal to 0.5%, further preferably greater than or equal to 0.75%, and especially preferably greater than or equal to 1%. From the viewpoint of effectively improving the transparency, the ratio of the area of the bright part region to the total of the area of the dark part region and the area of the bright part region is preferably less than or equal to 7.8%, more preferably less than or equal to 6.6%, further preferably less than or equal to 4%, especially preferably less than or equal to 3%, and most preferably less than or equal to 2.5%.

Since a sea-island state having the above-mentioned specific dark part and bright parts is easily generated and the transparency can be effectively improved, it is preferred that the interlayer film according to the present invention include at least two kinds of thermoplastic resins. For the purpose of generating a sea-island state having the above-mentioned specific dark part and bright parts, it is preferred that at least two kinds of thermoplastic resins sorted by kind be selected. Moreover, in the case where the thermoplastic resin is a polyvinyl acetal resin, also by controlling the synthesis condition of the polyvinyl acetal resin, a sea-island state having the interlayer film to have the above-mentioned specific dark part and bright parts can be generated.

Since a sea-island state having the above-mentioned specific dark part and bright parts is easily generated and the transparency can be effectively improved, it is preferred that the thermoplastic resin contained in the dark part region and the thermoplastic resin contained in the bright part region be different from each other.

Since a sea-island state having the above-mentioned specific dark part and bright parts is easily generated and the transparency can be effectively improved, it is preferred that the thermoplastic resin contained in the dark part region have a hydroxyl group, the thermoplastic resin contained in the bright part region have a hydroxyl group, and the content ratio of the hydroxyl group of the thermoplastic resin contained in the dark part region and the content ratio of the hydroxyl group of the thermoplastic resin contained in the bright part region be different from each other.

Since a sea-island state having the above-mentioned specific dark part and bright parts is easily generated and the transparency can be effectively improved, it is preferred that the thermoplastic resin contained in the dark part region be a polyvinyl acetal resin, and it is preferred that the thermoplastic resin contained in the bright part region be a polyvinyl acetal resin. Since a sea-island state having the above-mentioned specific dark part and bright parts is easily generated and the transparency can be effectively improved, it is preferred that the content ratio of the hydroxyl group of the polyvinyl acetal resin contained in the dark part region and the content ratio of the hydroxyl group of the polyvinyl acetal resin contained in the bright part region be different from each other. In this connection, it is not always necessary to allow both of the thermoplastic resin contained in the dark part region and the thermoplastic resin contained in the bright part region to be polyvinyl acetal resins.

For the purpose of generating a sea-island state having the above-mentioned specific dark part and bright parts, in the case where at least two kinds of thermoplastic resins are used, 1) a first interlayer film including a first thermoplastic resin and a second interlayer film including a second thermoplastic resin may be used, 2) an interlayer film including a first thermoplastic resin and a second thermoplastic resin as a new raw material may be used, and 3) a first thermoplastic resin and a second thermoplastic resin as new raw materials may be used. Examples of the interlayer film including a thermoplastic resin include unwanted portions (waste pieces) at both ends of an interlayer film which are generated in a production process of the interlayer film, unwanted portions (trimmings) at the periphery of an interlayer film which are generated in a production process of laminated glass, an interlayer film for laminated glass obtained by separating and removing glass plates from a defective product of laminated glass generated in a production process of laminated glass, an interlayer film for laminated glass obtained by separating and removing glass plates from laminated glass obtained by disassembling a used vehicle and a decrepit building, and the like. As an approach for reusing interlayer films including different thermoplastic resins as a part of the raw material for the purpose of reducing the environmental load, for example, an approach for reusing a multilayer interlayer film, in which a layer X containing a thermoplastic resin and a layer Y containing a thermoplastic resin different from the thermoplastic resin contained in the layer X are layered, as a part of the raw material has not been sufficiently studied. By using the multilayer interlayer film as a part of the raw material, the transparency of the interlayer film according to the present invention is enhanced, as well as the environmental load can be reduced.

Hereinafter, the present invention will be elucidated by describing specific embodiments and examples of the present invention with reference to the drawings.

FIG. 1 shows a multi-layered interlayer film including an interlayer film for laminated glass in accordance with the first embodiment of the present invention schematically represented as a partially cut-away sectional view.

The interlayer film 1 shown in FIG. 1 is a multi-layered interlayer film having a two or more-layer structure (layered structure). The interlayer film 1 is used for obtaining laminated glass. The interlayer film 1 is an interlayer film for laminated glass. The interlayer film 1 is provided with a first layer 2, a second layer 3 arranged on a first surface 2a side of the first layer 2, and a third layer 4 arranged on a second surface 2b side opposite to the first surface 2a of the first layer 2. The second layer 3 is layered on the first surface 2a of the first layer 2. The third layer 4 is layered on the second surface 2b of the first layer 2. The first layer 2 is an intermediate layer. For example, the second layer 3 and the third layer 4 are protective layers and are surface layers in the present embodiment. The first layer 2 is arranged between the second layer 3 and the third layer 4 to be sandwiched. Accordingly, the interlayer film 1 has a multi-layer structure in which the second layer 3, the first layer 2 and the third layer 4 are layered in this order.

It is preferred that the surface 3a at a side opposite to the first layer 2 side of the second layer 3 be a surface on which a laminated glass member is layered. It is preferred that the surface 4a at a side opposite to the first layer 2 side of the third layer 4 be a surface on which a laminated glass member is layered.

In this connection, other layers may be arranged between the first layer 2 and the second layer 3 and between the first layer 2 and the third layer 4, respectively. It is preferred that each of the second layer 3 and the third layer 4 be directly layered on the first layer 2. Examples of the other layers include a layer containing a thermoplastic resin such as a polyvinyl acetal resin and a layer containing polyethylene terephthalate and the like.

From the viewpoint of further enhancing the penetration resistance of laminated glass prepared with the interlayer film, it is preferred that the first layer 2 contain at least one kind of a thermoplastic resin and it is more preferred that the first layer 2 contain a polyvinyl acetal resin and a plasticizer, it is preferred that the second layer 3 contain at least one kind of a thermoplastic resin and it is more preferred that the second layer 3 contain a polyvinyl acetal resin and a plasticizer, and it is preferred that the third layer 4 contain at least one kind of a thermoplastic resin and it is more preferred that the third layer 4 contain a polyvinyl acetal resin and a plasticizer.

In the multi-layered interlayer film 1 shown in FIG. 1, at least one layer among the first layer 2, the second layer 3 and the third layer 4 is an interlayer film (being in a sea-island state) corresponding to the interlayer film according to the present invention. The first layer 2 may be an interlayer film (being in a sea-island state) corresponding to the interlayer film according to the present invention, the second layer 3 may be an interlayer film (being in a sea-island state) corresponding to the interlayer film according to the present invention, and the third layer 4 may be an interlayer film (being in a sea-island state) corresponding to the interlayer film according to the present invention. In the case where the multi-layered interlayer film is a multi-layered interlayer film with a three-layer structure, it is preferred that the surface layer be an interlayer film (being in a sea-island state) corresponding to the interlayer film according to the present invention. In this case, only one surface layer may be an interlayer film corresponding to the interlayer film according to the present invention, both surface layers may be interlayer films corresponding to the interlayer films according to the present invention, and it is preferred that both surface layers be interlayer films corresponding to the interlayer films according to the present invention. Even when the interlayer film according to the present invention is used as a surface layer (an interlayer film), it is possible to improve the adhesivity.

FIG. 2 shows an interlayer film for laminated glass in accordance with the second embodiment of the present invention schematically represented as a partially cut-away sectional view.

The interlayer film 31 shown in FIG. 2 is a single-layered interlayer film having a one-layer structure. The interlayer film 31 is a first layer. The interlayer film 31 is used for obtaining laminated glass. The interlayer film 31 is an interlayer film for laminated glass. The interlayer film 31 is an interlayer film (being in a sea-island state) corresponding to the interlayer film according to the present invention.

The interlayer film according to the present invention, 1) like the interlayer film 31, may be used as a single-layered interlayer film for obtaining laminated glass, and 2) like the interlayer film 1, may be used together with other interlayer films as a multi-layered interlayer film for obtaining laminated glass.

In the interlayer film 1, each of the second layer 3 and the third layer 4 is layered on each of both faces of the first layer 2. In the multi-layered interlayer film, the second layer needs only to be arranged on the first surface side of the first layer. The second layer is arranged on the first surface side of the first layer, and the third layer does not need to be arranged on the second surface side of the first layer. In this context, the second layer is arranged on the first surface side of the first layer, and it is preferred that the third layer be arranged on the second surface side of the first layer. By allowing the third layer to be arranged on the second surface side of the first layer, the handling properties of the interlayer film and the penetration resistance of laminated glass are further enhanced. Furthermore, at the surfaces of both sides of the interlayer film, the adhesivity to a laminated glass member and the like can be adjusted. In this connection, in the case where the third layer is absent, the adhesivity of an outer surface of the second layer of the interlayer film to a laminated glass member can be adjusted.

Hereinafter, the details of each ingredient included in the interlayer film for laminated glass according to the present invention will be described.

(Thermoplastic Resin)

The interlayer film includes at least one kind of a thermoplastic resin. Examples of the thermoplastic resin include a polyvinyl acetal resin, an ethylene-vinyl acetate copolymer resin, an ethylene-acrylic acid copolymer resin, a polyurethane resin, a polyvinyl alcohol resin, a polyester resin, and the like.

A thermoplastic resin contained in the sea-like dark part region is defined as the first thermoplastic resin. A thermoplastic resin contained in the island-like bright part region is defined as the second thermoplastic resin. From the viewpoint of further effectively improving the transparency, it is preferred that the content ratio of the hydroxyl group of the first thermoplastic resin be higher than the content ratio of the hydroxyl group of the second thermoplastic resin. That is, it is preferred that the content ratio of the hydroxyl group of the second thermoplastic resin contained in the bright part region be lower than the content ratio of the hydroxyl group of the first thermoplastic resin contained in the dark part region. From the viewpoint of further effectively improving the transparency, the absolute value of the difference between the content ratio of the hydroxyl group of the first thermoplastic resin and the content ratio of the hydroxyl group of the second thermoplastic resin is preferably greater than or equal to 0.5% by mole, more preferably greater than or equal to 1% by mole, further preferably greater than or equal to 4% by mole, and especially preferably greater than or equal to 6% by mole. The absolute value of the difference between the content ratio of the hydroxyl group of the first thermoplastic resin and the content ratio of the hydroxyl group of the second thermoplastic resin is preferably less than or equal to 15% by mole, more preferably less than or equal to 12% by mole, further preferably less than or equal to 10% by mole, and especially preferably less than or equal to 8.5% by mole. From the viewpoint of further effectively improving the transparency, the absolute value of the difference between the content ratio of the hydroxyl group of the first thermoplastic resin and the content ratio of the hydroxyl group of the second thermoplastic resin is preferably less than or equal to 8% by mole, more preferably less than or equal to 7.5% by mole, further preferably less than or equal to 7% by mole, and especially preferably less than or equal to 6.5% by mole.

Since a sea-island state having the above-mentioned specific dark part and bright parts is easily generated, it is preferred that the thermoplastic resin be a polyvinyl acetal resin.

For example, the polyvinyl acetal resin can be produced by acetalizing polyvinyl alcohol with an aldehyde. For example, the polyvinyl alcohol is obtained by saponifying polyvinyl acetate. The saponification degree of the polyvinyl alcohol generally lies within the range of 70 to 99.9% by mole.

The average polymerization degree of the polyvinyl alcohol is preferably greater than or equal to 200, more preferably greater than or equal to 500, more preferably greater than or equal to 1000, more preferably greater than or equal to 1500, further preferably greater than or equal to 1600, preferably less than or equal to 3000, more preferably less than or equal to 2700, and further preferably less than or equal to 2400. When the average polymerization degree is greater than or equal to the above lower limit, the penetration resistance of laminated glass is further enhanced. When the average polymerization degree is less than or equal to the above upper limit, the resin is easily formed into an interlayer film.

From the viewpoint of further enhancing the penetration resistance of laminated glass, it is especially preferred that the average polymerization degree of the polyvinyl alcohol be greater than or equal to 1500 and less than or equal to 3000.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin lie within the range of 3 to 5, and it is more preferred that the number of carbon atoms be 3 or 4. When the number of carbon atoms of the acetal group in the polyvinyl acetal resin is greater than or equal to 3, the glass transition temperature of the interlayer film is sufficiently lowered.

The aldehyde is not particularly limited. In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be combinedly used.

In the case where the thermoplastic resin contained in the sea-like dark part region is a polyvinyl acetal resin, the polyvinyl acetal resin contained in the sea-like dark part region is defined as a polyvinyl acetal resin (1). In the case where the thermoplastic resin contained in the island-like bright part region is a polyvinyl acetal resin, the polyvinyl acetal resin contained in the thermoplastic resin contained in the island-like bright part region is defined as a polyvinyl acetal resin (2). It is preferred that the polyvinyl acetal resin (1) be a thermoplastic resin contained at the largest content among thermoplastic resins contained in the dark part region. It is preferred that the polyvinyl acetal resin (2) be a thermoplastic resin contained at the largest content among thermoplastic resins contained in the bright part region.

The content ratio of the hydroxyl group (the amount of hydroxyl groups) of the polyvinyl acetal resin (1) is preferably greater than or equal to 20% by mole, more preferably greater than or equal to 25% by mole, further preferably greater than or equal to 28% by mole, especially preferably greater than or equal to 29% by mole, preferably less than or equal to 37% by mole, more preferably less than or equal to 35% by mole, further preferably less than or equal to 32% by mole, and especially preferably less than or equal to 31% by mole. When the content ratio of the hydroxyl group is greater than or equal to the above lower limit, the adhesive force of the interlayer film is moderately heightened and the penetration resistance of laminated glass is further enhanced. Moreover, when the content ratio of the hydroxyl group is less than or equal to the above upper limit, the flexibility of the interlayer film is enhanced and the handling of the interlayer film is facilitated.

The content ratio of the hydroxyl group of the polyvinyl acetal resin (2) is preferably greater than or equal to 15% by mole, more preferably greater than or equal to 18% by mole, further preferably greater than or equal to 20% by mole, especially preferably greater than or equal to 22% by mole, most preferably greater than or equal to 24% by mole, preferably less than or equal to 30% by mole, more preferably less than or equal to 28% by mole, further preferably less than or equal to 26% by mole, especially preferably less than 25% by mole, and most preferably less than or equal to 24.5% by mole. When the content ratio of the hydroxyl group is greater than or equal to the above lower limit, the adhesive force of the interlayer film is moderately heightened. Moreover, when the content ratio of the hydroxyl group is less than or equal to the above upper limit, the flexibility of the interlayer film is enhanced and the handling of the interlayer film is facilitated.

From the viewpoint of further effectively improving the adhesivity and the transparency, it is preferred that the content ratio of the hydroxyl group of the polyvinyl acetal resin (1) be higher than the content ratio of the hydroxyl group of the polyvinyl acetal resin (2). From the viewpoint of further effectively improving the adhesivity and the transparency, the absolute value of the difference between the content ratio of the hydroxyl group of the polyvinyl acetal resin (1) and the content ratio of the hydroxyl group of the polyvinyl acetal resin (2) is preferably greater than or equal to 0.5% by mole and more preferably greater than or equal to 1% by mole. The absolute value of the difference between the content ratio of the hydroxyl group of the polyvinyl acetal resin (1) and the content ratio of the hydroxyl group of the polyvinyl acetal resin (2) is preferably less than or equal to 8.5% by mole.

The content ratio of the hydroxyl group of the polyvinyl acetal resin is a value expressing the mole fraction determined by dividing the amount of ethylene groups to which the hydroxyl group is bonded by the total amount of ethylene groups in the main chain in terms of percentage. For example, the amount of ethylene groups to which the hydroxyl group is bonded can be measured in accordance with JIS K6726 "Testing methods for polyvinyl alcohol" to be determined.

The acetylation degree (the amount of acetyl groups) of the polyvinyl acetal resin (1) is preferably greater than or equal to 0.1% by mole, more preferably greater than or equal to 0.8% by mole, preferably less than or equal to 5% by mole, more preferably less than or equal to 1.5% by mole, and further preferably less than or equal to 1% by mole. When the acetylation degree is greater than or equal to the above lower limit, the compatibility between the polyvinyl acetal resin and a plasticizer is heightened. When the acetylation degree is less than or equal to the above upper limit, the mechanical strength of the interlayer film is further heightened.

The acetylation degree of the polyvinyl acetal resin (2) is preferably greater than or equal to 0.1% by mole, more preferably greater than or equal to 0.5% by mole, further preferably greater than 5% by mole, especially preferably greater than or equal to 10% by mole, most preferably greater than or equal to 12% by mole, preferably less than or equal to 30% by mole, more preferably less than or equal to 25% by mole, further preferably less than or equal to 20% by mole, and especially preferably less than or equal to 13% by mole. When the acetylation degree is greater than or equal to the above lower limit, the compatibility between the polyvinyl acetal resin and a plasticizer is heightened. When the acetylation degree is less than or equal to the above upper limit, the moisture resistance of the interlayer film and laminated glass is enhanced.

The acetylation degree is a value expressing the mole fraction determined by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain in terms of percentage. For example, the amount of ethylene groups to which the acetal group is bonded can be measured in accordance with JIS K6728 "Testing methods for polyvinyl butyral".

The acetalization degree of the polyvinyl acetal resin (1) (the butyralization degree in the case of a polyvinyl butyral resin) is preferably greater than or equal to 50% by mole, more preferably greater than or equal to 60% by mole, further preferably greater than or equal to 65% by mole, especially preferably greater than or equal to 67% by mole, preferably less than or equal to 85% by mole, more preferably less than or equal to 73% by mole, and further preferably less than or equal to 71% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree of the polyvinyl acetal resin (2) (the butyralization degree in the case of a polyvinyl butyral resin) is preferably greater than or equal to 50% by mole, more preferably greater than or equal to 58% by mole, further preferably greater than or equal to 62% by mole, preferably less than or equal to 85% by mole, more preferably less than or equal to 83% by mole, further preferably less than or equal to 80% by mole, and especially preferably less than or equal to 66% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree is a value expressing the mole fraction determined by dividing the amount of ethylene groups to which the acetal group is bonded by the total amount of ethylene groups in the main chain in terms of percentage. The acetalization degree can be calculated by a method in accordance with JIS K6728 "Testing methods for polyvinyl butyral".

In this connection, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. In the case where the polyvinyl acetal resin is a polyvinyl butyral resin, the content ratio of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

Since the penetration resistance of laminated glass is further enhanced, it is preferred that the polyvinyl acetal resin (2) contained in the bright part region be a polyvinyl acetal resin (2A) with an acetylation degree (2a) less than or equal to 8% by mole and an acetalization degree (2a) greater than or equal to 70% by mole or a polyvinyl acetal resin (2B) with an acetylation degree (2b) greater than 8% by mole. The polyvinyl acetal resin (2) may be the polyvinyl acetal resin (2A), and may be the polyvinyl acetal resin (2B).

The acetylation degree (2a) of the polyvinyl acetal resin (2A) is less than or equal to 8% by mole, preferably less than or equal to 7.5% by mole, more preferably less than or equal to 7% by mole, further preferably less than or equal to 6.5% by mole, especially preferably less than or equal to 5% by mole, preferably greater than or equal to 0.1% by mole, more preferably greater than or equal to 0.5% by mole, further preferably greater than or equal to 0.8% by mole, and especially preferably greater than or equal to 1% by mole. When the acetylation degree (2a) is less than or equal to the above upper limit and greater than or equal to the above lower limit, the transfer of a plasticizer can be easily controlled and the sound insulating properties of laminated glass are further heightened.

The acetalization degree (2a) of the polyvinyl acetal resin (2A) is greater than or equal to 70% by mole, preferably greater than or equal to 70.5% by mole, more preferably greater than or equal to 71% by mole, further preferably greater than or equal to 71.5% by mole, especially preferably greater than or equal to 72% by mole, preferably less than or equal to 85% by mole, more preferably less than or equal to 83% by mole, further preferably less than or equal to 81% by mole, and especially preferably less than or equal to 79% by mole. When the acetalization degree (2a) is greater than or equal to the above lower limit, the sound insulating properties of laminated glass are further heightened. When the acetalization degree (2a) is less than or equal to the above upper limit, the reaction time required for producing the polyvinyl acetal resin (2A) can be shortened.

The content ratio (2a) of the hydroxyl group of the polyvinyl acetal resin (2A) is preferably greater than or equal to 18% by mole, more preferably greater than or equal to 19% by mole, further preferably greater than or equal to 20% by mole, especially preferably greater than or equal to 21% by mole, most preferably greater than or equal to 25% by mole, preferably less than or equal to 31% by mole, more preferably less than or equal to 30% by mole, further preferably less than or equal to 29% by mole, and especially preferably less than or equal to 28% by mole. When the content ratio (2a) of the hydroxyl group is greater than or equal to the above lower limit, the adhesive force of the interlayer film is further heightened. When the content ratio (2a) of the hydroxyl group is less than or equal to the above upper limit, the sound insulating properties of laminated glass are further heightened.

The acetylation degree (2b) of the polyvinyl acetal resin (2B) is greater than 8% by mole, preferably greater than or equal to 9% by mole, more preferably greater than or equal to 9.5% by mole, further preferably greater than or equal to 10% by mole, especially preferably greater than or equal to 10.5% by mole, preferably less than or equal to 30% by mole, more preferably less than or equal to 28% by mole, further preferably less than or equal to 26% by mole, especially preferably less than or equal to 24% by mole, and most preferably less than or equal to 22% by mole. When the acetylation degree (2b) is greater than or equal to the above lower limit, the sound insulating properties of laminated glass are further heightened. When the acetylation degree (2b) is less than or equal to the above upper limit, the reaction time required for producing the polyvinyl acetal resin (2B) can be shortened.

The acetalization degree (2b) of the polyvinyl acetal resin (2B) is preferably greater than or equal to 50% by mole, more preferably greater than or equal to 53% by mole, further preferably greater than or equal to 55% by mole, especially preferably greater than or equal to 60% by mole, preferably less than or equal to 80% by mole, more preferably less than or equal to 78% by mole, further preferably less than or equal to 76% by mole, especially preferably less than or equal to 74% by mole, and most preferably less than or equal to 68% by mole. When the acetalization degree (2b) is greater than or equal to the above lower limit, the sound insulating properties of laminated glass are further heightened. When the acetalization degree (2b) is less than or equal to the above upper limit, the reaction time required for producing the polyvinyl acetal resin (2B) can be shortened.

The content ratio (2b) of the hydroxyl group of the polyvinyl acetal resin (2B) is preferably greater than or equal to 18% by mole, more preferably greater than or equal to 19% by mole, further preferably greater than or equal to 20% by mole, especially preferably greater than or equal to 21% by mole, preferably less than or equal to 31% by mole, more preferably less than or equal to 30% by mole, further preferably less than or equal to 29% by mole, especially preferably less than or equal to 28% by mole, and most preferably less than 25% by mole. When the content ratio (2b) of the hydroxyl group is greater than or equal to the above lower limit, the adhesive force of the interlayer film is further heightened. When the content ratio (2b) of the hydroxyl group is less than or equal to the above upper limit, the sound insulating properties of laminated glass are further heightened.

It is preferred that each of the polyvinyl acetal resin (2A) and the polyvinyl acetal resin (2B) be a polyvinyl butyral resin.

In the case where the interlayer film includes at least two kinds of polyvinyl acetal resins differing in content ratio of the hydroxyl group, in 100% by weight of the polyvinyl acetal resin included in the interlayer film, the content of a polyvinyl acetal resin with a content ratio of the hydroxyl group less than 25% by mole is preferably greater than or equal to 0.1% by weight, more preferably greater than or equal to 0.5% by weight, further preferably greater than or equal to 0.8% by weight, preferably less than or equal to 5.5% by weight, more preferably less than or equal to 4.5% by weight, and further preferably less than or equal to 2.2% by weight.

(Plasticizer)

It is preferred that the interlayer film include a plasticizer. It is preferred that the dark part region contain a plasticizer. It is preferred that the bright part region contain a plasticizer. The plasticizer contained in the dark part region and the plasticizer contained in the bright part region may be the same as or different from each other. One kind of the plasticizer may be used alone, and two or more kinds thereof may be combinedly used.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

Examples of the monobasic organic acid ester include a glycol ester obtained by the reaction of a glycol and a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, hepthylic acid, n-octylic acid, 2-ethylhexanoic acid, n-nonylic acid, decylic acid, and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyd, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

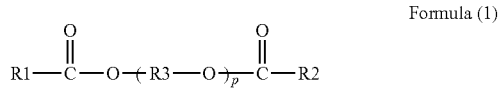

Formula (1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

Relative to 100 parts by weight of the thermoplastic resin included in the interlayer film, the content of the plasticizer included in the interlayer film is preferably greater than or equal to 25 parts by weight, more preferably greater than or equal to 35 parts by weight, further preferably greater than or equal to 39 parts by weight, preferably less than or equal to 50 parts by weight, and more preferably less than or equal to 42 parts by weight.

The plasticizer contained in the dark part region is defined as a plasticizer (1). In the dark part region, the content of the plasticizer (1) relative to 100 parts by weight of the first thermoplastic resin or 100 parts by weight of the polyvinyl acetal resin (1) is defined as the content (1). The plasticizer contained in the bright part region is defined as a plasticizer (2). The content of the plasticizer (2) relative to 100 parts by weight of the second thermoplastic resin or 100 parts by weight of the polyvinyl acetal resin (2) contained in the bright part region is defined as the content (2).

The content (1) of the plasticizer (1) relative to 100 parts by weight of the first thermoplastic resin or 100 parts by weight of the polyvinyl acetal resin (1) is preferably greater than or equal to 25 parts by weight, more preferably greater than or equal to 35 parts by weight, further preferably greater than or equal to 39 parts by weight, preferably less than or equal to 50 parts by weight, and more preferably less than or equal to 42 parts by weight. When the content (1) is greater than or equal to the above lower limit, the flexibility of the interlayer film is enhanced and the handling of the interlayer film is facilitated. When the content (1) is less than or equal to the above upper limit, the transparency of the interlayer film is further enhanced and the penetration resistance of laminated glass is further enhanced.

The content (2) of the plasticizer (2) relative to 100 parts by weight of the second thermoplastic resin or 100 parts by weight of the polyvinyl acetal resin (2) is preferably greater than or equal to 35 parts by weight, further preferably greater than or equal to 40 parts by weight, more preferably greater than or equal to 60 parts by weight, preferably less than or equal to 90 parts by weight, more preferably less than or equal to 80 parts by weight, and further preferably less than or equal to 72 parts by weight. When the content (2) is greater than or equal to the above lower limit, the flexibility of the interlayer film is enhanced and the handling of the interlayer film is facilitated. When the content (2) is less than or equal to the above upper limit, the penetration resistance of laminated glass is further enhanced.

From the viewpoint of enhancing the penetration resistance of laminated glass, it is preferred that the content (1) be smaller than the content (2).

From the viewpoint of further enhancing the penetration resistance of laminated glass, the absolute value of the difference between the content (1) and the content (2) is preferably greater than or equal to 2 parts by weight, more preferably greater than or equal to 5 parts by weight, and further preferably greater than or equal to 8 parts by weight. The absolute value of the difference between the content (1) and the content (2) is preferably less than or equal to 22 parts by weight.

(Other Ingredients)

The above-mentioned interlayer film may include additives such as an oxidation inhibitor, an ultraviolet ray shielding agent, a light stabilizer, a flame retardant, an antistatic agent, a pigment, a dye, an adhesive force regulating agent, a moisture-resistance improving agent, a fluorescent brightening agent, and an infrared ray absorber, as necessary. One kind of these additives may be used alone, and two or more kinds thereof may be combinedly used.

(Other Details of Interlayer Film for Laminated Glass)

The thickness of the interlayer film according to the present invention is not particularly limited. From the viewpoint of the practical aspect, the thickness of the interlayer film is preferably greater than or equal to 0.1 mm, more preferably greater than or equal to 0.25 mm, preferably less than or equal to 3 mm, and more preferably less than or equal to 1.5 mm. When the thickness of the interlayer film is greater than or equal to the above lower limit, the penetration resistance of laminated glass is enhanced. When the thickness of the interlayer film is less than or equal to the above upper limit, the transparency of the interlayer film is further improved.

The production method of the interlayer film for laminated glass according to the present invention is not particularly limited. In the case of obtaining a single-layered interlayer film, examples of the production method of the interlayer film for laminated glass according to the present invention include a method of allowing a resin composition to be extruded using an extruder. In the case of allowing an interlayer film to be layered together with other interlayer films to obtain a multi-layered interlayer film, examples of the production method of the interlayer film for laminated glass according to the present invention include a method of separately forming respective resin compositions used for constituting respective layers into respective layers, and then, for example, allowing the respective obtained layers to be layered, a method of allowing respective resin compositions used for constituting respective layers to be coextruded using an extruder and allowing the respective layers to be layered, and the like. A production method of extrusion-molding is preferred because the method is suitable for continuous production.

(Laminated Glass)

FIG. 3 shows an example of laminated glass prepared with a multi-layered interlayer film including an interlayer film for laminated glass in accordance with the first embodiment of the present invention schematically represented as a sectional view.

The laminated glass 11 shown in FIG. 3 is provided with a first laminated glass member 21, a second laminated glass member 22 and an interlayer film 1. The interlayer film 1 is arranged between the first laminated glass member 21 and the second laminated glass member 22 to be sandwiched.

The first laminated glass member 21 is layered on a first surface 1a of the interlayer film 1. The second laminated glass member 22 is layered on a second surface 1b opposite to the first surface 1a of the interlayer film 1. The first laminated glass member 21 is layered on an outer surface 3a of the second layer 3 of the interlayer film 1. The second laminated glass member 22 is layered on an outer surface 4a of the third layer 4 of the interlayer film 1. The interlayer film 31 may be used in place of the interlayer film 1.

As described above, the laminated glass according to the present invention is provided with a first laminated glass member, a second laminated glass member and an interlayer film arranged between the first laminated glass member and the second laminated glass member, and the interlayer film includes the interlayer film for laminated glass according to the present invention. The interlayer film for laminated glass according to the present invention may be arranged alone between the first laminated glass member and the second laminated glass member, and may be arranged together with other interlayer films between the first laminated glass member and the second laminated glass member.

Examples of the laminated glass member include a glass plate and a PET (polyethylene terephthalate) film and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that the first laminated glass member and the second laminated glass member be each a glass plate or a PET film and at least one among the first laminated glass member and the second laminated glass member be a glass plate.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the laminated glass member is preferably greater than or equal to 1 mm, preferably less than or equal to 5 mm, and more preferably less than or equal to 3 mm. Moreover, in the case where the laminated glass member is a glass plate, the thickness of the glass plate is preferably greater than or equal to 1 mm, preferably less than or equal to 5 mm, and more preferably less than or equal to 3 mm. In the case where the laminated glass member is a PET film, the thickness of the PET film is preferably greater than or equal to 0.03 mm and preferably less than or equal to 0.5 mm.

The production method of the laminated glass is not particularly limited. For example, an interlayer film is sandwiched between the first laminated glass member and the second laminated glass member, and the air remaining between each of the first laminated glass member and the second laminated glass member and the interlayer film is removed by allowing the members to pass through a pressing roll or by putting the members into a rubber bag and allowing the contents to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The interlayer film and the laminated glass can be used for automobiles, railway vehicles, aircraft, ships, buildings and the like. The interlayer film and the laminated glass can also be used for applications other than these applications. It is preferred that the interlayer film and the laminated glass be an interlayer film and laminated glass for vehicles or for construction, and it is more preferred that the interlayer film and the laminated glass be an interlayer film and laminated glass for vehicles. The interlayer film and the laminated glass can be used for a windshield, side glass, rear glass or roof glass of an automobile and the like. The interlayer film and the laminated glass are suitably used for automobiles.

Hereinafter, the present invention will be described in more detail with reference to examples. The present invention is not limited only to these examples.

The following materials were used.
(Thermoplastic Resin)
PVB (1) (n-butyl aldehyde was used, the average polymerization degree of PVA of 1700, the content ratio of the hydroxyl group of 30.4% by mole, the acetylation degree of 0.8% by mole, the acetalization degree (the butyralization degree) of 68.8% by mole)
PVB (2) (n-butyl aldehyde was used, the average polymerization degree of PVA used in respective examples and comparative examples, and the content ratio of the hydroxyl group, the acetylation degree and the acetalization degree (the butyralization degree) of PVB (2) are shown in the following Table 1)

With regard to the polyvinyl butyral (PVB) resin, the acetalization degree (the butyralization degree), the acetylation degree and the content ratio of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.
(Plasticizer)
3GO (triethylene glycol di-2-ethylhexanoate)
Other Ingredients:
T-326 (an ultraviolet ray shielding agent, 2-(2'-hydroxy-3'-t-butyl-5-methylphenyl)-5-chlorobenzotriazole, "Tinuvin 326" available from BASF Japan Ltd.)
BHT (an oxidation inhibitor, 2,6-di-t-butyl-p-cresol)

Example 1

Preparation of Interlayer Film:
One hundred parts by weight of PVB (1), 0.87 parts by weight of PVB (2), 40 parts by weight of a plasticizer (3GO), 0.2 parts by weight of an ultraviolet ray shielding agent (Tinuvin 326) and 0.2 parts by weight of an oxidation inhibitor (BHT) were mixed to obtain a composition.

By allowing the composition obtained to be extruded using an extruder, an interlayer film (800 μm in thickness) was obtained.

Preparation of Laminated Glass:
The interlayer film obtained was cut into a size of 80 mm in longitudinal length by 80 mm in transversal length. Next, the interlayer film was sandwiched between two sheets of transparent float glass (80 mm in longitudinal length by 80 mm in transversal length by 2.5 mm in thickness), held in place for 30 minutes at 90° C. and pressed under vacuum with a vacuum laminator to obtain a laminate. With regard to the laminate, interlayer film portions protruded from the sheet of glass were cut away to obtain a sheet of laminated glass.

Examples 2 to 12 and Comparative Example 1

An interlayer film and a sheet of laminated glass were prepared in the same manner as that in Example 1 except that the kind and content of the polyvinyl acetal resin were set to those listed in the following Table 1.
(Evaluation)
(1) Observation with Transmission Electron Microscope (TEM)

A small piece of an interlayer film subjected to trimming was stained for 12 hours at 60° C. with an aqueous 2% osmic acid solution and then washed. The temperature of the small piece was controlled to −20° C., the small piece was cut in the direction perpendicular to the thickness direction of the interlayer film with a cryo-microtome (available from Leica Microsystems GmbH, Main body: UCT, Cryochamber: EMFCS), the center part in the thickness direction of the interlayer film was cut into a section with a thickness of 70 nm, and the section was placed on a sheet mesh attached with a supporting film to prepare a measurement sample.

With regard to the measurement sample obtained, using a transmission electron microscope ("JEM-2100" available from JEOL Ltd.), a (square) region of 7.29 μm by 7.29 μm was observed at 3000 magnifications. Using the Photoshop CS4 ver. 11.0 (available from Adobe Systems Incorporated), an image photographed by the transmission electron microscope was subjected to binarization processing with a threshold value of 170. After the binarization processing, the number of picture elements (the number of pixels) in a bright part region are determined. The arithmetic average value of major diameters of the bright parts, the median value of major diameters of the bright parts and the area ratio of the bright part were determined on the basis of the number of pixels.

Whether or not a measurement sample is in a sea-island state was judged according to the following criteria. Furthermore, the area ratio of the bright part region to the total of the area of the dark part region and the area of the bright part region was evaluated. Moreover, the arithmetic average value of major diameters of the bright parts and the median value of major diameters of the bright parts were determined. In this connection, the arithmetic average value of major diameters of the bright parts means an average value of major diameters of all the bright parts confirmed in an observed region, and the median value of major diameters of the bright parts means a median value calculated when major diameters of all the bright parts confirmed in an observed region are arranged in ascending order. In this connection, the PVB (1) was included in the dark part region since a thermoplastic resin (a polyvinyl butyral resin) having relatively high content ratio of the hydroxyl group is included therein, and the PVB (2) was included in the bright part region since a thermoplastic resin (a polyvinyl butyral resin) having relatively low content ratio of the hydroxyl group is included therein.

[Sea-Island State]

A: Being in a sea-island state

B: Not being in a sea-island state (2) Transparency

Using a goniophotometer ("GONIOPHOTOMETER GP-200" available from MURAKAMI COLOR RESEARCH LABORATORY), the laminated glass obtained was measured for the scattered light intensity value under the condition of the Detector angle of 30°, the High Volt of 900, and the Sensitivity of 900. The lower the scattered light intensity value is, the smaller degree of haze the laminated glass has and the more excellent in transparency the laminated glass is. In this connection, it is preferred that the scattered light intensity value be less than or equal to 110, it is more preferred that the value be less than or equal to 90 and it is further preferred that the value be less than or equal to 50.

The details and the results are shown in the following Table 1.

TABLE 1

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Ingredients to be blended (parts by weight) | PVB(1) | | 100 | 100 | 100 | 100 | 100 | 100 | 100 | 100 |
| | PVB(2) | | 0.87 | 1.26 | 1.51 | 1.97 | 0.66 | 1.22 | 1.80 | 1.65 |
| | 3GO | | 40 | 40 | 40 | 40 | 40 | 40 | 40 | 40 |
| | T-326 | | 0.2 | 0.2 | 0.2 | 0.2 | 0.2 | 0.2 | 0.2 | 0.2 |
| | BHT | | 0.2 | 0.2 | 0.2 | 0.2 | 0.2 | 0.2 | 0.2 | 0.2 |
| | PVB(1) | Average polymerization degree of PVA | 1700 | 1700 | 1700 | 1700 | 1700 | 1700 | 1700 | 1700 |
| | | Butyralization degree (mol %) | 68.8 | 68.8 | 68.8 | 68.8 | 68.8 | 68.8 | 68.8 | 68.8 |
| | | Acetylation degree (mol %) | 0.8 | 0.8 | 0.8 | 0.8 | 0.8 | 0.8 | 0.8 | 0.8 |
| | | Content ratio of hydroxyl group (mol %) | 30.4 | 30.4 | 30.4 | 30.4 | 30.4 | 30.4 | 30.4 | 30.4 |
| | PVB(2) | Average polymerization degree of PVA | 3000 | 3000 | 3000 | 3000 | 3000 | 2300 | 3000 | 3000 |
| | | Butyralization degree (mol %) | 63.8 | 63.8 | 63.8 | 63.8 | 65.7 | 65.5 | 61.4 | 60.2 |
| | | Acetylation degree (mol %) | 12.1 | 12.1 | 12.1 | 12.1 | 11.7 | 12.0 | 14.7 | 16.1 |
| | | Content ratio of hydroxyl group (mol %) | 24.1 | 24.1 | 24.1 | 24.1 | 22.6 | 22.5 | 23.9 | 23.7 |
| Evaluation | Sea-island state | | A | A | A | A | A | A | A | A |
| | Area ratio of bright part region (%) | | 1.39 | 2.10 | 2.42 | 1.94 | 0.75 | 2.60 | 2.25 | 2.11 |
| | Arithmetic average value (nm) | | 192.3 | 172.5 | 112.5 | 155.7 | 226.8 | 133.2 | 137.8 | 146.9 |
| | Median value (nm) | | 154.0 | 157.9 | 77.0 | 139.6 | 238.5 | 91.1 | 112.7 | 123.5 |
| | Transparency: Scattered light intensity value | | 45 | 51 | 42 | 60 | 60 | 53 | 71 | 68 |

| | | | Ex. 9 | Ex. 10 | Ex. 11 | Ex. 12 | Comp. Ex. 1 |
|---|---|---|---|---|---|---|---|
| Ingredients to be blended (parts by weight) | PVB(1) | | 100 | 100 | 100 | 100 | 100 |
| | PVB(2) | | 1.51 | 2.78 | 3.35 | 5.60 | 11.21 |
| | 3GO | | 40 | 40 | 40 | 40 | 40 |
| | T-326 | | 0.2 | 0.2 | 0.2 | 0.2 | 0.2 |
| | BHT | | 0.2 | 0.2 | 0.2 | 0.2 | 0.2 |
| | PVB(1) | Average polymerization degree of PVA | 1700 | 1700 | 1700 | 1700 | 1700 |

TABLE 1-continued

|  |  |  |  |  |  |  |  |
|---|---|---|---|---|---|---|---|
|  |  | Butyralization degree (mol %) | 68.8 | 68.8 | 68.8 | 68.8 | 68.8 |
|  |  | Acetylation degree (mol %) | 0.8 | 0.8 | 0.8 | 0.8 | 0.8 |
|  |  | Content ratio of hydroxyl group (mol %) | 30.4 | 30.4 | 30.4 | 30.4 | 30.4 |
|  | PVB(2) | Average polymerization degree of PVA | 3000 | 3000 | 3000 | 3000 | 3000 |
|  |  | Butyralization degree (mol %) | 54.5 | 63.8 | 63.8 | 63.8 | 63.8 |
|  |  | Acetylation degree (mol %) | 21.3 | 12.1 | 12.1 | 12.1 | 12.1 |
|  |  | Content ratio of hydroxyl group (mol %) | 24.2 | 24.1 | 24.1 | 24.1 | 24.1 |
| Evaluation | Sea-island state |  | A | A | A | A | A |
|  | Area ratio of bright part region (%) |  | 1.97 | 2.52 | 3.46 | 6.57 | 35.91 |
|  | Arithmetic average value (nm) |  | 156.0 | 172.4 | 212.6 | 302.8 | 511.3 |
|  | Median value (nm) |  | 134.4 | 153.2 | 234.0 | 308.0 | 479.0 |
|  | Transparency: Scattered light intensity value |  | 55 | 102 | 108 | 148 | 283 |

In this connection, FIG. 4 shows an example of an image of an interlayer film, which is included in the interlayer film according to the present invention, photographed by a transmission electron microscope.

EXPLANATION OF SYMBOLS

1: Interlayer film (Multi-layered interlayer film)
1a: First surface
1b: Second surface
2: First layer (Interlayer film)
2a: First surface
2b: Second surface
3: Second layer (Interlayer film)
3a: Outer surface
4: Third layer (Interlayer film)
4a: Outer surface
11: Laminated glass
21: First laminated glass member
22: Second laminated glass member
31: Interlayer film (Single-layered interlayer film)

The invention claimed is:

1. A method for producing an interlayer film for laminated glass, comprising the step of:
extruding a resin composition by using an extruder to obtain an interlayer film being, an extrusion product,
wherein the interlayer film is in a sea-island state having a sea-like dark part and a plurality of island-like bright parts to be identified when observed with a transmission electron microscope,
a polyvinyl acetal resin is contained in the dark part region and a polyvinyl acetal resin is contained in the bright part region,
the content ratio of the hydroxyl group of the polyvinyl acetal resin contained in the dark part region is higher than the content ratio of the hydroxyl group of the polyvinyl acetal resin contained in the bright part region,
the ratio of the area of the bright part region to the total of the area of the dark part region and the area of the bright part region is less than or equal to 7.8%,
the arithmetic average value of major diameters of the bright parts is less than or equal to 400 nm or the median value of major diameters of the bright parts is less than or equal to 400 nm, and
the thickness of the interlayer film is greater than or equal to 0.1 mm.

2. The method for producing an interlayer film for laminated glass according to claim 1, wherein the arithmetic average value of major diameters of the bright parts is greater than or equal to 50 nm and less than or equal to 400 nm or the median value of major diameters of the bright parts is greater than or equal to 50 nm and less than or equal to 400 nm.

3. The method for producing an interlayer film for laminated glass according to claim 1, wherein the content ratio of the hydroxyl, group of the polyvinyl acetal resin contained in the dark part region is greater than or equal to 25% by mole.

4. The method for producing an interlayer film for laminated glass according to claim 1,
wherein the content ratio of the hydroxyl group of the polyvinyl acetal resin contained in the bright part region is less than 25% by mole.

5. The method for producing an interlayer film for laminated glass according to claim 1,
wherein the ratio of the area of the bright part region to the total of the area of the dark part region and the area of the bright part region is greater than or equal to 0.5% and less than or equal to 7.8%.

6. The method for producing an interlayer film for laminated glass according to claim 1, wherein the interlayer film further comprises a plasticizer.

7. The method for producing an interlayer film for laminated glass according to claim 1,
wherein the arithmetic average value of major diameters of the bright parts is greater than or equal to 50 nm and less than or equal to 400 nm.

8. The method for producing an interlayer film for laminated glass according to claim 1,
wherein the median value of major diameters of the bright parts is greater than or equal to 50 nm and less than or equal to 400 nm.

* * * * *